Figure 1:
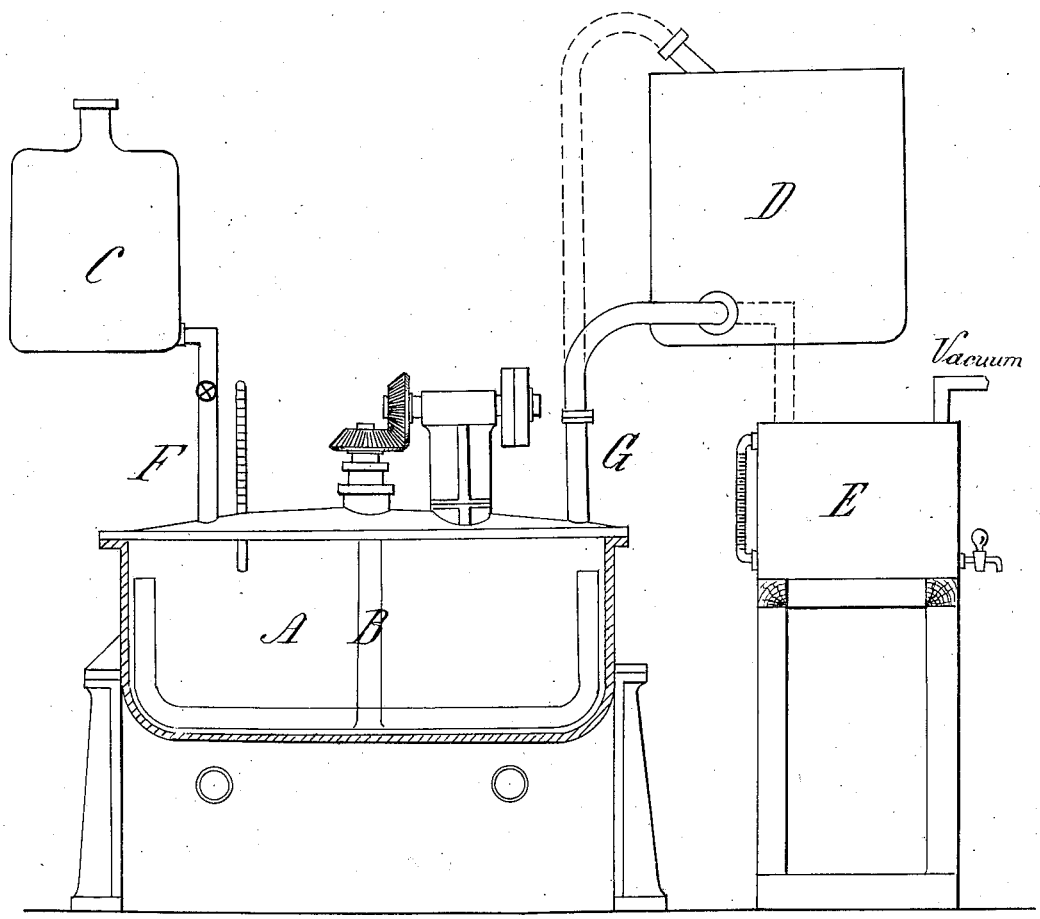

M. MUGDAN.
PROCESS OF PREPARING ORGANIC COMPOUNDS CONTAINING THE ACETYL GROUP.
APPLICATION FILED MAR. 18, 1909.

944,372.

Patented Dec. 28, 1909.
2 SHEETS—SHEET 1.

Witnesses
F. Stern
W. Goldberger

Inventor
Martin Mugdan
by B. Singer
Attorney

M. MUGDAN.
PROCESS OF PREPARING ORGANIC COMPOUNDS CONTAINING THE ACETYL GROUP.
APPLICATION FILED MAR. 18, 1909.
944,372.
Patented Dec. 28, 1909.
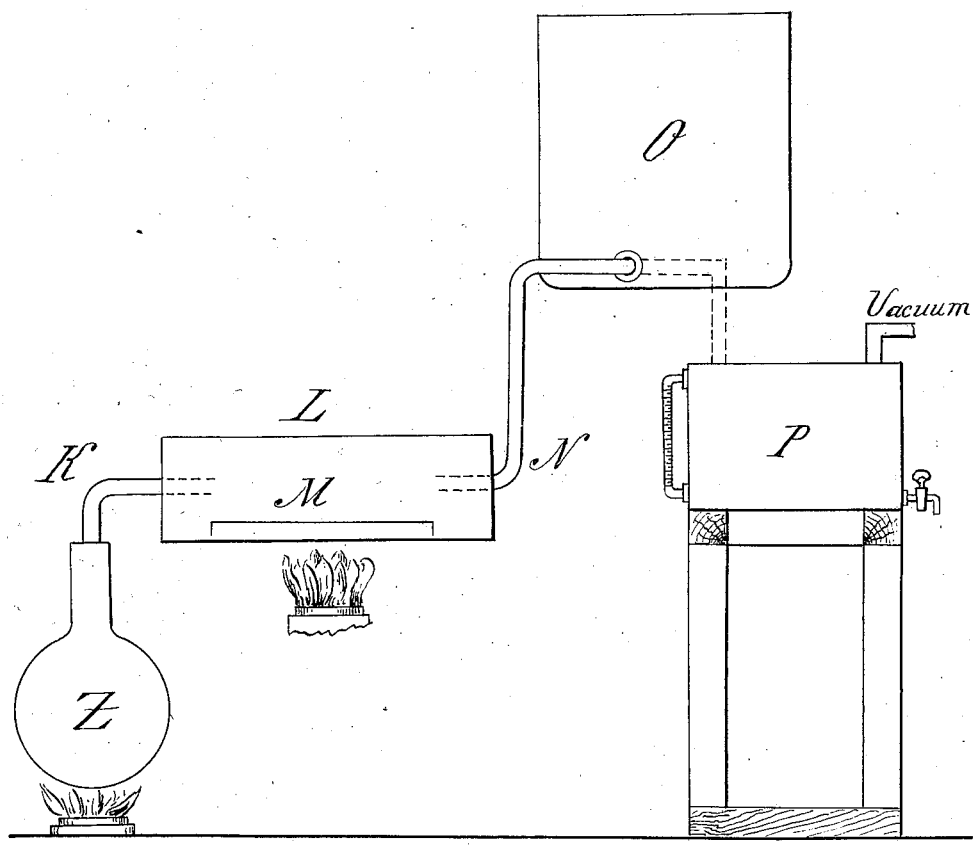
Witnesses
F. Stern
W. Goldberger
Inventor
Martin Mugdan
by B. Singer
Attorney

UNITED STATES PATENT OFFICE.

MARTIN MUGDAN, OF NUREMBERG, GERMANY, ASSIGNOR TO THE FIRM OF CONSORTIUM FÜR ELEKTROCHEMISCHE INDUSTRIE G. M. B. H., OF NUREMBERG, GERMANY.

PROCESS OF PREPARING ORGANIC COMPOUNDS CONTAINING THE ACETYL GROUP.

944,372.   Specification of Letters Patent.   Patented Dec. 28, 1909.

Application filed March 18, 1909. Serial No. 484,324.

*To all whom it may concern:*

Be it known that I, MARTIN MUGDAN, doctor of philosophy, chemist, a subject of the German Emperor, residing at 54 Gugelstrasse, Nuremberg, Kingdom of Bavaria, German Empire, have invented new and useful Improvements in Processes of Preparing Organic Compounds Containing the Acetyl Group, of which the following is a specification.

Experiments for enabling silicon tetrachlorid to be used instead of other chlorids, and in particular instead of the costly phosphorous chlorid, for the production of organic acid chlorids or anhydrids, have already been undertaken. In particular, G. Rauter (*Liebig's Annalen* 270, 260) investigated the reaction of silicon chlorid upon organic acids and their salts. He found that butyric acid and silicon tetrachlorid although not reacting upon each other in a cold state, do so when heat is applied. According to Rauter, potassium acetate does not react upon silicon tetrachlorid when heated to 140–150° C. in eight hours, even under pressure. It is only after a further eight hours heating to 170–180° C. that "the conversion to chlorid of potassium, silicic acid and anhydrid was found to be completed upon opening". It is also stated in the German Patent No. 171,146 that silicon tetrachlorid does not react on acetates even at high temperatures. Contrary to these statements I have found that silicon tetrachlorid, reacts with acetates such for example as sodium acetate, when heated, and that this reaction takes place speedily and quantitatively even at normal pressure and with a temperature but little raised, acetyl chlorid or acetic anhydrid being obtained according to the quantitative proportions.

In the accompanying drawings, I have shown an apparatus well adapted for use in the practice of my process.

In the drawing Figure 1 is a vertical section through an apparatus for that form of my process, in which I heat a mixture of silicon tetrachlorid and sodium acetate. Fig. 2 is a vertical section through an apparatus for that form of my process, in which I conduct silicon tetrachlorid in the form of vapor over the acetate.

The operation may be carried out by allowing silicon tetrachlorid to flow slowly on to finely pulverized acetate (preferably sodium acetate, or acetate of lime) while agitating and with reflux cooling. It is advantageous to add an indifferent liquid to the salt at the start (when obtaining acetic anhydrid it is preferable to add acetic anhydrid obtained in a previous operation) so that from the beginning a paste is obtained which is thoroughly agitated. The reaction product is then distilled off and at the end of the operation a vacuum is preferably employed. The acetate may also be placed in a tube and the silicon tetrachlorid may be conducted in the form of vapor over the salt heated to 160–180° C. The reaction product is then distilled over directly.

In order to obtain acetic anhydrid I use the materials according to the following equation:

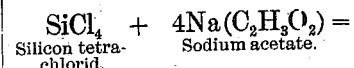
$$SiCl_4 + 4Na(C_2H_3O_2) =$$
Silicon tetra-   Sodium acetate.
chlorid.

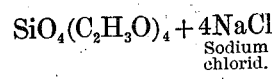
$$SiO_4(C_2H_3O)_4 + 4NaCl$$
Sodium chlorid.

The intermediary mixed anhydrid decomposes upon distillation into acetic anhydrid and silicic anhydrid:

$$SiO_4(C_2H_3O)_4 = SiO_2 + 2(C_2H_3O)_2O$$
Silicic   Acetic
anhydrid.   anhydrid.

In order to obtain acetyl chlorid I use the materials according to the following equation:

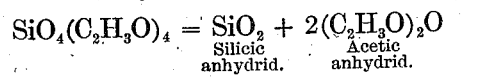
$$SiCl_4 + \quad H_3O_2) =$$
Silicon tetra-   Sodium acetate.
chlorid.

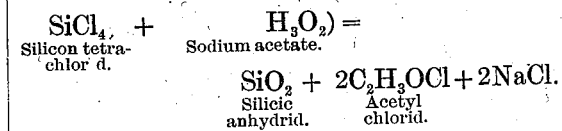
$$SiO_2 + 2C_2H_3OCl + 2NaCl.$$
Silicic   Acetyl
anhydrid.   chlorid.

In the use of the apparatus illustrated in Fig. 1, the finely divided acetate is placed in the vessel A mounted upon a suitable gas or other heater and provided with a suitable stirrer B. The acetate is heated to say 100° C. and silicon tetrachlorid contained in the reservoir C is allowed to slowly enter the vessel A through the tube F, the stirrer being operated during the addition of the chlorid. The heat is continued until all acetic anhydrid or acetyl chlorid (as the case may be) is distilled through the pipe G, cooled by the cooler D, into the vessel E.

If I wish to carry out my process by conducting the vapors of silicon tetrachlorid over the acetate, I may use the apparatus illustrated in Fig. 2.

The silicon tetrachlorid is contained in the container Z, from which I evolve vapors of silicon tetrachlorid by heating the container. The said container is connected by the pipe K with the tube L, in which finely divided acetate is placed in the vessel M. The silicon tetrachlorid enters the tube L, and reacts with the acetate, which is heated by a suitable gas or other heater to between 160 and 180° C. The acetic anhydrid or acetyl chlorid formed is distilled through the pipe N, cooled by the cooler O, into the vessel P.

I claim:

1. The process for the manufacture of organic compounds containing the acetyl group, which consists in allowing silicon tetrachlorid to react on a metallic acetate at normal pressure.

2. The process for the manufacture of organic compounds containing the acetyl group, which consists in allowing silicon tetrachlorid to react upon a metallic acetate at a temperature below 180° C.

In testimony whereof I affix my signature in presence of two witnesses.

MARTIN MUGDAN.

Witnesses:
ERICH BAUM,
LUDWIG SENNINGER.